United States Patent [19]

King

[11] Patent Number: 5,308,039
[45] Date of Patent: May 3, 1994

[54] BALL VALVE

[76] Inventor: Robert King, 23122 8th St., Newhall, Calif. 91321

[21] Appl. No.: 128,531

[22] Filed: Sep. 29, 1993

[51] Int. Cl.⁵ ............................................. F16K 5/20
[52] U.S. Cl. .................................... 251/192; 251/188
[58] Field of Search ............... 251/157, 160, 161, 162, 251/163, 188, 192, 182

[56] References Cited

U.S. PATENT DOCUMENTS

| 2,639,882 | 5/1953 | Conrad | 251/188 |
| 4,940,210 | 7/1990 | Gilmore, III | 251/188 X |

FOREIGN PATENT DOCUMENTS

| 1529484 | 6/1968 | France | 251/188 |

Primary Examiner—John C. Fox
Attorney, Agent, or Firm—Poms, Smith, Lande & Rose

[57] ABSTRACT

A ball valve having a main body portion with a throughbore and a rotatable ball valve closing off the throughbore. The ball is of resilient plastic and is comprised of a pair of interconnected sides defining a slot therethrough. The valve body portion has cams associated with the throughbore engageable with the ball side when the same is rotated. The sides, in a first position, close off the throughbore, the cams engage the flexible sides and camming the same into fully seated closure of the throughbore. When rotated away from engagement with the cams, the slot in the ball valve is aligned with the throughbore allowing fluid flow therethrough.

8 Claims, 1 Drawing Sheet

Figure 1:
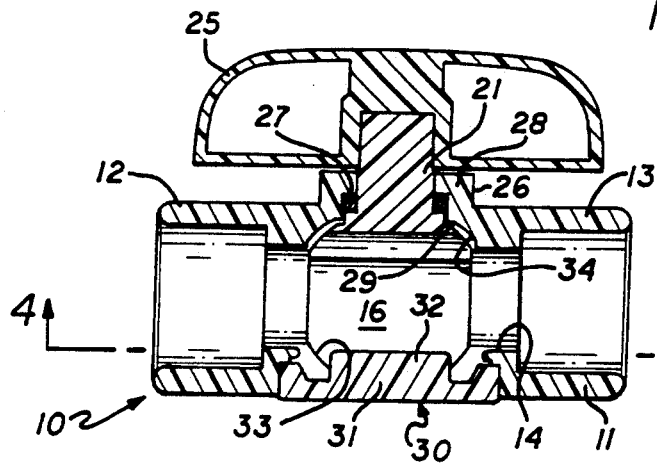
Figure 2:
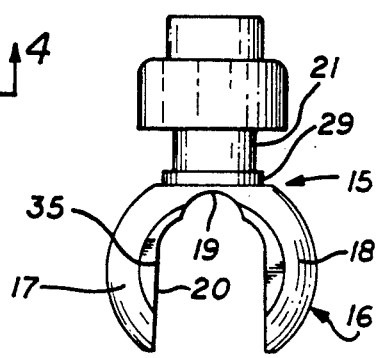
Figure 3:
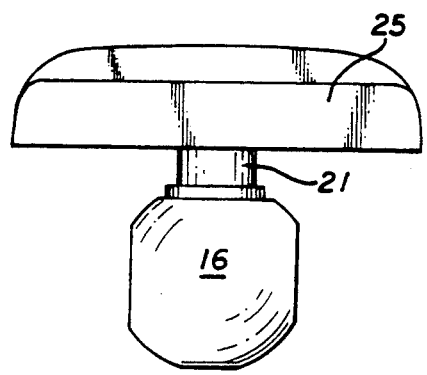
Figure 4:
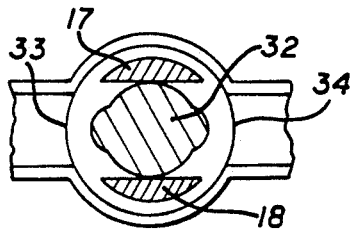
Figure 5:
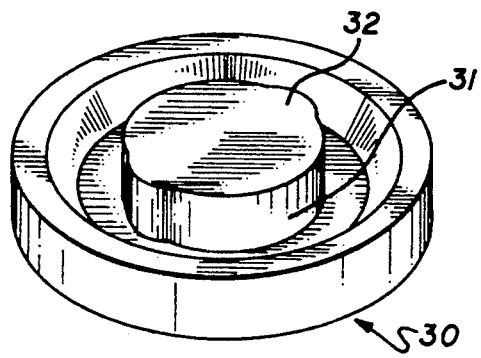
Figure 6:
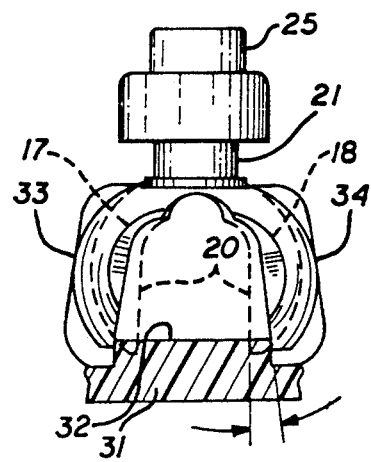

["# BALL VALVE\n\n## BACKGROUND OF THE INVENTION\n\n### 1. Field of the Invention\n\nThe invention relates to ball valves; and, more particularly, to a ball valve that fully seats in a throughbore through a valve body without additional parts to effect such seal.\n\n### 2. Description of the Prior Art\n\nVarious types of ball valves are known in the art. Such valves usually have a number of parts or components to effect a good positive seal of the bore through the valve body. Some of these parts or components must be carefully machined in order to carry out such seal in that the ball valve must be fully seated in closing off the bore through the valve body. Thus, such conventional ball valves have a large number of parts to effect such seal, such as 10 parts.\n\nThere is thus a need for a ball valve wherein a positive seal is effected of the bore through the valve body using a lesser number of parts than prior ball valves and which eliminates the need for machining of parts or separate machined valve seals.\n\n## SUMMARY OF THE INVENTION\n\nIt is an object of this invention to provide an improved rotary ball valve.\n\nIt is a further object of this invention to provide a rotary ball valve which effects sealing of the bore through the valve without need for machined, separate valve seat seals.\n\nIt is still further an object of this invention to carry out the foregoing objects wherein a lesser number of parts are used than in prior known rotary ball valves.\n\nThese and other objects are preferably accomplished by providing a ball valve having a main body portion with a throughbore and a rotatable ball closing off the throughbore. The ball is of resilient plastic and is comprised of a pair of interconnected sides defining a slot therethrough. The valve body portion has cams associated with the throughbore engageable with the ball side when the same is rotated. The sides in a first position close off the throughbore, the cams engage the flexible sides and camming the same into fully seated closure of the throughbore. When rotated 90° away from engagement with the cams, the slot in the ball valve is aligned with the throughbore allowing fluid flow therethrough. The foregoing is accomplished without a need for valve seat seals and using a lesser number of parts than known ball valves.\n\n## BRIEF DESCRIPTION OF THE DRAWINGS\n\nFIG. 1 is an elevational cross-sectional view of a ball valve in accordance with the teachings of the invention;\n\nFIG. 2 is an elevational side view of the rotatable ball alone of the valve of FIG. 1;\n\nFIG. 3 is an elevational front view of the rotatable ball alone of the valve of FIG. 1;\n\nFIG. 4 is a view taken along lines 4—4 of FIG. 1 but showing the ball valve in the FIG. 2 position;\n\nFIG. 5 is a perspective view of the camming portion alone of the valve of FIGS. 1 to 4; and\n\nFIG. 6 is a side view of the valve of FIG. 1 illustrating operation thereof.\n\n## DESCRIPTION OF THE PREFERRED EMBODIMENTS\n\nReferring now to FIG. 1 of the drawings, a ball valve 10 is shown having a main valve body 11 with an inlet 12 and an outlet 13. The inlet 12 and outlet 13 may be threaded on the interior for connecting suitable conduits thereto.\n\nValve body 11 has a throughbore 14 with ports 33, 34, respectively, communication with inlet 12 and outlet 13. Ports 33, 34 are generally rounded to conform to ball valve 15 as will be discussed. A ball 15 (see FIG. 2) is mounted internally of valve body 11. As seen in FIG. 2, ball 15 has a main ball portion 16 comprised of a pair of interconnected rounded side portions 17, 18. Portions 17, 18 are interconnected at the top by a web portion 19. In manufacture, ball valve 15 (parts 17–19) may be one unitary piece of a resilient plastic material forming a slot 20 therethrough. A valve stem 21 is integral with ball 15 or otherwise coupled thereto and terminates at top in a snap-on handle 25. As handle 25 is turned, stem 21, frictionally held thereto, also turns and rotates ball 15.\n\nAs seen in FIG. 1, valve body 11 has a central apertured boss 26 on the upper surface thereof through which stem 21 extends. A resilient 0-ring 27 is disposed between the underside of flange 28 and shoulder 29 on the upper surface of ball 15.\n\nAs particularly contemplated in the present invention, in addition to the structure of ball 15, camming means 30 are provided in valve body 11. Such camming means 30 (see also FIG. 5) includes an insert portion 31 mounted in the lower portion of valve body 11 having an upwardly extending cam portion 32. Cam portion 32 has a width slightly greater than the spacing X (FIG. 2) between side portions 17, 18. Cam portion 32 has a pair of opposed camming protrusions 33, 34 (FIG. 5).\n\nAs seen in FIG. 1, cam portion 32 is disposed between side portions 16, 17, the ball 15 being in the FIG. 3 position whereby fluid can flow through valve 10 entering inlet 12, through slot 20, and out of outlet 13.\n\nAs handle 25 is rotated from the FIGS. 1 and 3 position to the FIG. 2 position, the lower portions of side portions 17, 18 engage camming protrusions 33, 34 (FIG. 6) and, due to the width of the same and the resiliency of ball 15, the side portions 17, 18 flex and spread outwardly from the dotted line position to the solid line position), the curved surfaces thereof abutting against and closing off ports 33, 34 (see FIG. 4). That is, the curved surfaces of ball portions 17, 18 seal ports 33, 34 without the need for separate valve seals. Ports lo 33, 34 are slightly angled about 5° from vertical to match the angle a (FIG. 6) of flexed ball sides 17, 18. The foregoing is accomplished using only five parts as opposed to conventional ball valves using ten parts or so to accomplish the same.\n\nWhen it is desired to open valve 10, the handle 25 is turned to the FIG. 1 and FIG. 3 position, allowing fluid flow through valve 10.\n\nAny suitable materials, except for ball 15, may be used. Ball valve 15 is preferably of a suitable resilient material, such as Acetal. The opening leading into each side of slot 20 may be chamfered or tapered, as at chamfer 35 (FIG. 2) and the inner vertical side walls forming slot 20 may be disposed at a slight angularity from the vertical, e.g., 5° or so away from the vertical centerline of slot 20.\n\nAlthough a particular embodiment of the invention has been disclosed, variations thereof may occur to an"]

artisan and the scope of the invention is only to be limited by the scope of the appended claims.

I claim:

1. A ball valve comprising:

a main valve body portion having a throughbore with an inlet and outlet in fluid communication therewith;

a ball disposed in said throughbore, said ball being comprised of a pair of spaced, flexible, outwardly curved side portions defining a slot therebetween, said curved side portions conforming to a pair of ports, one of said ports being disposed on one side of said throughbore and the other of said ports being disposed on the other side of said throughbore, said inlet, outlet ports, slot and throughbore forming an opening through said valve for fluid flow therethrough when said slot is aligned with said throughbore; and camming means associated with said valve body for flexing said side portions away from said camming means into mating and sealing relationship with said ports when said side portions engage said camming means.

2. In the ball valve of claim 1 including a stem fixedly coupled to said ball extending upwardly through an opening in said valve body.

3. In the ball valve of claim 2 including a handle coupled to said stem for rotating the same.

4. In the ball valve of claim 3 including sealing means associated with said opening in said valve body for fluidly sealing said stem from said valve body.

5. In the ball of claim 1 wherein said side portions are interconnected at top by an integral flexible portion.

6. In the ball valve of claim 1 wherein said camming means includes a generally circular shaped cam with normally camming protrusions disposed between said side portions when said slot is aligned with said throughbore and of an overall width slightly greater than the spacing between said side portions whereby, when said ball is rotated, said side portions engage said camming protrusions and flex outwardly away therefrom.

7. In the ball valve of claim 6 wherein each of said ports makes an angle of about 5° with respect to the vertical and away from the central vertical axis of said slot.

8. In the ball of claim 1 wherein said side portions are of plastic or other suitable resilient material.

* * * * *